United States Patent [19]

Yamanaka

[11] 4,078,636
[45] Mar. 14, 1978

[54] ENERGY ABSORBING APPARATUS FOR VEHICLES

[75] Inventor: Akira Yamanaka, Yokohama, Japan

[73] Assignee: Mitsubishi Jidosha Kogyo Kabushiki Kaisha, Japan

[21] Appl. No.: 673,118

[22] Filed: Apr. 2, 1976

[30] Foreign Application Priority Data

Apr. 14, 1975 Japan .......................... 50-50962[U]
Dec. 19, 1975 Japan .............................. 50-152217

[51] Int. Cl.² ............................................. F16F 7/12
[52] U.S. Cl. .................................... 188/1 C; 180/82 R; 280/748; 293/73; 296/35 R; 403/2; 403/58
[58] Field of Search ............ 188/1 C, 321; 180/82 R, 180/91; 280/734, 748, 770; 293/63, 69 R, 73, 89; 296/35 R, 35 A, 35 B, 65 A, 28 M; 403/2, 57, 58

[56] References Cited

U.S. PATENT DOCUMENTS

| | | | |
|---|---|---|---|
| 1,233,969 | 7/1917 | Branst | 188/321 |
| 1,370,835 | 3/1921 | Munson | 188/321 |
| 2,309,238 | 1/1943 | Corey | 403/2 |
| 2,590,970 | 4/1952 | Jensen | 293/69 R |
| 3,717,224 | 2/1973 | Leach et al. | 188/1 C |
| 3,759,351 | 9/1973 | Purple | 188/1 C |
| 3,810,656 | 5/1974 | Fox et al. | 188/1 C |
| 3,831,998 | 8/1974 | Hewitt | 296/35 B |
| 3,927,730 | 12/1975 | Winslow | 296/35 B |
| 3,981,530 | 9/1976 | Yamanaka et al. | 188/1 C |

FOREIGN PATENT DOCUMENTS

| | | | |
|---|---|---|---|
| 731,074 | 8/1932 | France | 296/35 A |
| 833,293 | 1/1952 | Germany | 296/35 R |
| 824,922 | 12/1959 | United Kingdom | 296/35 R |
| 204,145 | 8/1966 | U.S.S.R. | 296/35 R |

*Primary Examiner*—Trygve M. Blix
*Assistant Examiner*—Edward R. Kazenske
*Attorney, Agent, or Firm*—Robert E. Burns; Emmanuel J. Lobato; Bruce L. Adams

[57] ABSTRACT

An energy absorbing apparatus that absorbs impact energy due to the collision of a vehicle by drawing a drawable member, in such a manner as to subject said drawable member to plastic deformation based on the relative movement between the vehicle's body and frame. The drawable member is supported rotatably by brackets between the vehicle's body and frame, and the large diameter portion of the drawable member is drawably passed through a die mounted on the brackets.

13 Claims, 15 Drawing Figures

ENERGY ABSORBING APPARATUS FOR VEHICLES

BACKGROUND OF THE INVENTION

This invention relates to improvements in an energy absorbing apparatus for vehicles that is adapted to be placed between relatively displaceable members, such as the cabin or burden carrier and the frame of a truck, or the cabin and the frame of a saloon or sedan.

When a vehicle collides, the cabin or the burden carrier mounted on the frame is relatively displaced over the frame by the reaction of impact force applied on the vehicle. As a consequence, there have been such dangers that the passenger be violently thrown outside against the colliding object or crushed by the burden carrier moving with enormous kinetic energy.

To eliminate the aforesaid shortcoming, several means have been proposed, among which is an energy absorbing apparatus comprising a die that is provided between the cabin or burden carrier and the frame through spherical surfaces so as to be rotatable in all directions, and a drawable member passed through a die hole formed in said die. If the colliding vehicle is subjected to impact force exceeding a given value, the cabin or burden carrier is relatively displaced over the frame, whereupon the drawable member of said energy absorbing apparatus is drawn aslant through the die, thereby absorbing the kinetic energy of the cabin or burden carrier. However, the above-described energy absorbing apparatus has a disadvantage of high manufacture cost, because of the need to provide the spherical surfaces through which the die and the drawable member are to be supported on the frame and the cabin or burden carrier.

SUMMARY OF THE INVENTION

The aforesaid shortcoming of the conventional apparatus has been successfully eliminated by this invention which provides an energy absorbing apparatus for vehicles comprising a first bracket rotatably fitted to the cabin or burden carrier of a vehicle, a second bracket fitted to the first bracket so as to be rotatable on a plane perpendicular to the rotating plane of the first bracket, a third bracket rotatably fitted to the frame of the vehicle, a fourth bracket fitted to the third bracket so as to be rotatable on a plane perpendicular to the rotating plane of the third bracket, a die having a die hole that is fitted to either of the second and fourth brackets, and a drawable member whose large-diameter portion is drawably passed through the die hole and small-diameter portion is fixedly passed through a guide hole in the other of the second and fourth brackets, whereby, when impact force exceeding a given value is applied to the vehicle, the cabin or burden carrier moves with respect to the frame to cause the die and drawable member to rotate first, second, third and fourth brackets, and the kinetic energy of the cabin or burden carrier is absorbed by the plastic deformation of the drawable member that is thereupon drawn through the die.

BRIEF DESCRIPTION OF THE DRAWINGS

Some embodiments of the energy absorbing apparatus according to this invention will now be concretely described with reference to the accompanying drawings, in which.

DESCRIPTION OF PREFERRED EMBODIMENTS

Figure 1:
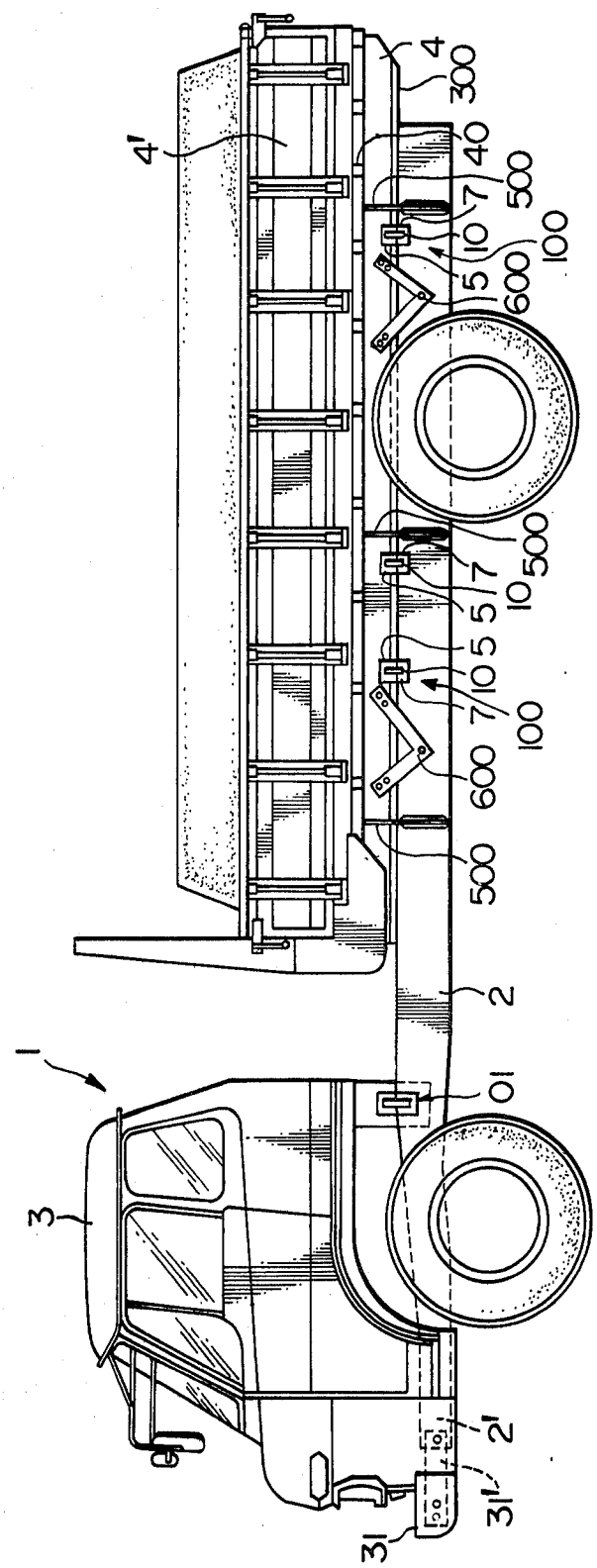
FIG. 1 is a schematic side elevation of a truck equipped with a first embodiment of the energy absorbing apparatus according to this invention.
Figure 2:
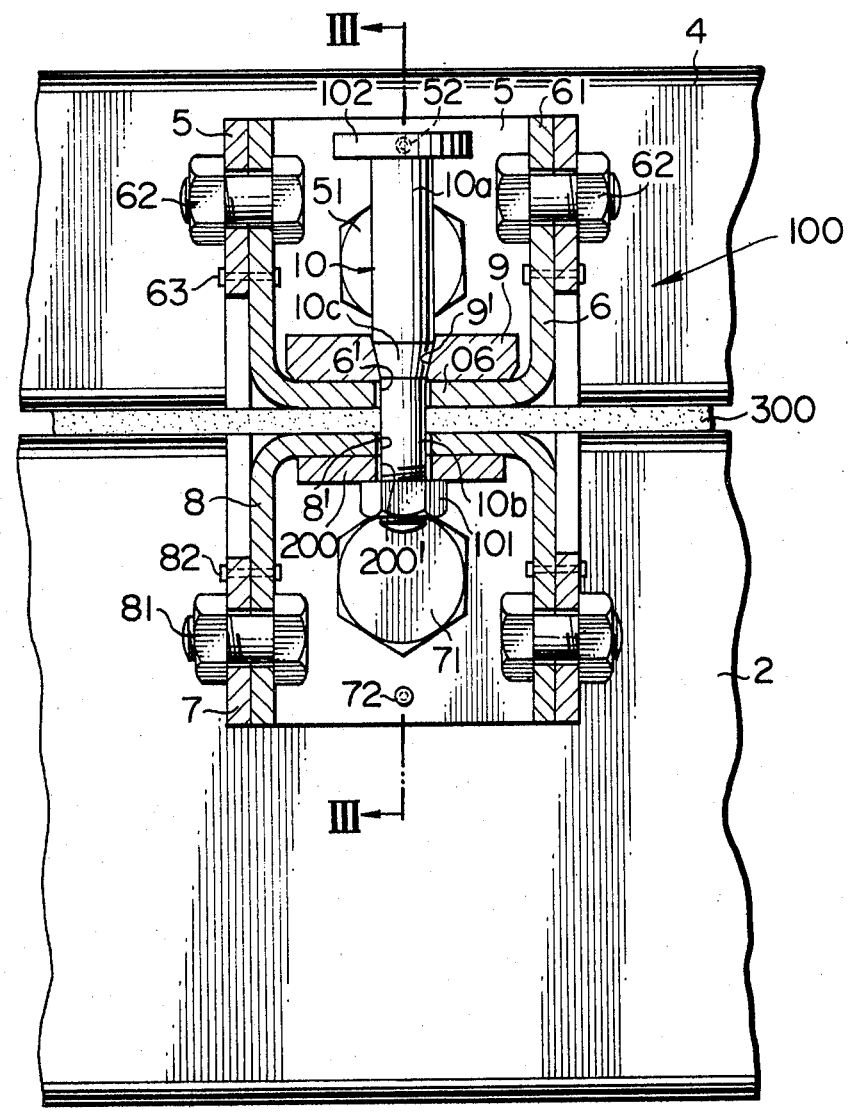
FIG. 2 is a partly cross-sectional side elevation showing a principal part of the first embodiment.
Figure 3:
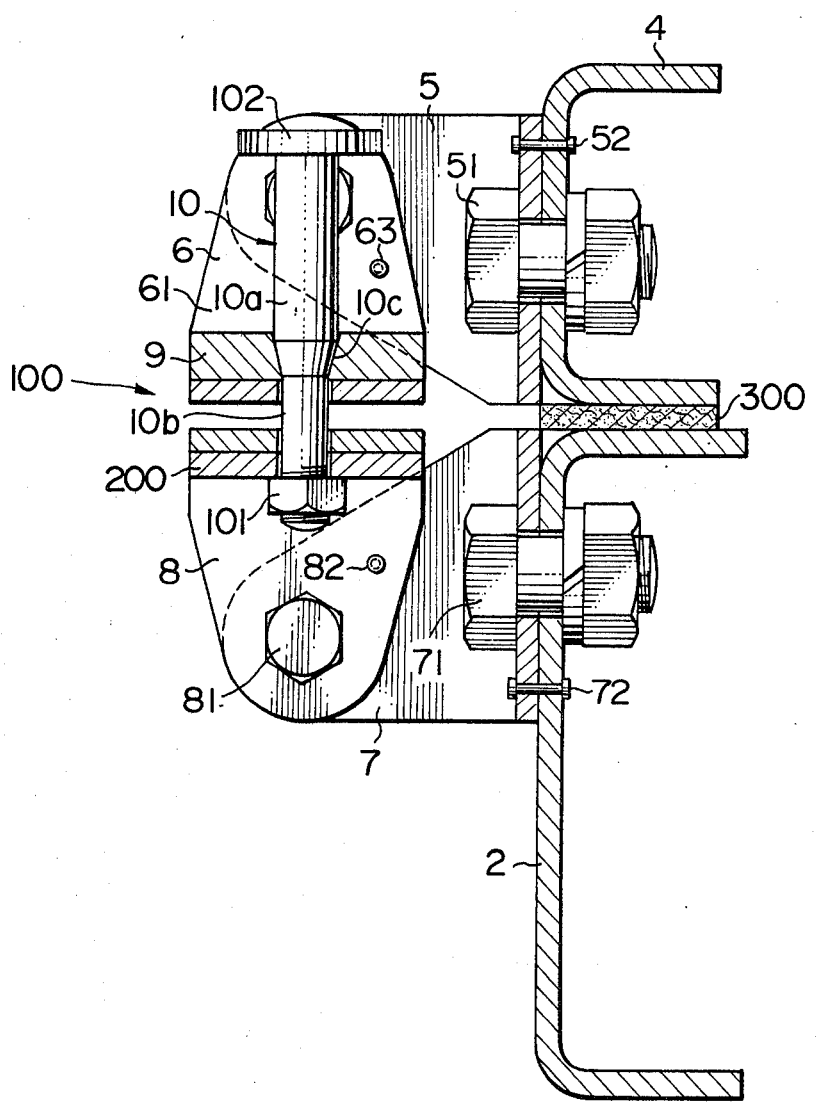
FIG. 3 is a cross-sectional view, looking in the direction of the arrow from the line III—III of FIG. 2.

In the first embodiment shown in FIGS. 1 through 4, a vehicle such as a truck 1 has a cabin 3 and a burden carrier 4' mounted on a chassis frame 2. Between the burden carrier 4' and chassis frame 2 is a friction plate 300, which is a member having high firction resistance and made of a material similar to a friction plate used as a brake pad of a friction brake, a longitudinal sill 4 running from front to rear of the truck, and a transverse sill 40 extending across the width of the truck.

The transverse sill 40 and longitudinal sill 4 are fixed to the burden carrier 4' as integral parts thereof. Also, under normal condition, the longitudinal sill 4, friction plate 300 and frame 2 are integrally joined together by means of U-bolts 500 and V-shaped holders 600.

Between the longitudinal sill 4 under the burden carrier 4' and the chassis frame 2 are provided a plurality of energy absorbing apparatus 100 whose details will be described later. Also, a known energy absorbing device, for example, a shock absorber 31', or a plastic-deformable member is provided between the front end 2' of the frame 2 and a bumper 31.

The energy absorbing apparatus 100 comprises a first bracket 5 made of a channel-shaped steel strip, which is fitted with a bolt 51 to the longitudinal sill 4 so as to be freely rotatable along the vertical side thereof and thus in a plane longitudinal of the truck 1. A first shear pin 52 is passed between the first bracket 5 and the longitudinal sill 4, at a position eccentric from the bolt 51, to restrain the rotation of the bracket 5 under normal condition.

Both flanges 61 of a second bracket 6, made of a channel-shaped steel strip, are fitted inside the first bracket 5 with two bolts 62 arranged on the same axis, so as to be rotatable on a plane perpendicular to the rotating plane of the first bracket 5. Thus the first bracket constitutes a support means for a bracket means, which bracket means in turn comprises the second bracket. Each of second shear pins 63 is passed through the second bracket 6 and first bracket 5, at a position eccentric from the bolt 62, to restrain the rotation of the second bracket 6 with respect to the first bracket 5 under normal condition.

A third bracket 7, made of a channel-shaped steel strip similar to the first bracket 5, is rotatably fitted to the frame 2 with a bolt 71, and the rotation of the third bracket 7 is restrained by a third shear pin 72 that is provided at a position eccentric from the bolt 71. Both flanges of a fourth bracket 8, made of a channel-shaped steel strip similar to the second bracket 6, are fitted with two bolts 81 arranged on the same axis to both flanges of the third bracket 7, so as to be rotatable on a plane perpendicular to the rotating plane of the third bracket 7. Thus the third and fourth brackets are interrelated in the same way as are the first and second brackets.

Each of the fourth shear pins 82 is passed between the fourth bracket 8 and third bracket 7, at a position eccentric from the bolt 81, so as to restrain the rotation of the fourth bracket. Reference numeral 9 denotes a die mounted or fixed on the central part 06 of the second bracket 6. Also reference numeral 10 designates a drawable member disposed vertically to absorb the kinetic energy. A tapered portion 10c formed on the lower continuation of a large-diameter portion 10a of the member 10 is passed through a die hole 9' in the die 9, while a small-diameter portion 10b through a hole 6' formed in the second bracket 6, a hole 8' in the fourth bracket 8, and a hole 200' in a washer 200.

By screwing a nut 101 onto the lower end of the drawable member 10, the longitudinal sill 4 is fixed to the frame 2. At the upper end of the drawable member 10, there is formed a stopper 102 to restrict the amount of deformation of the drawable member 10 on being drawn.

Figure 4:
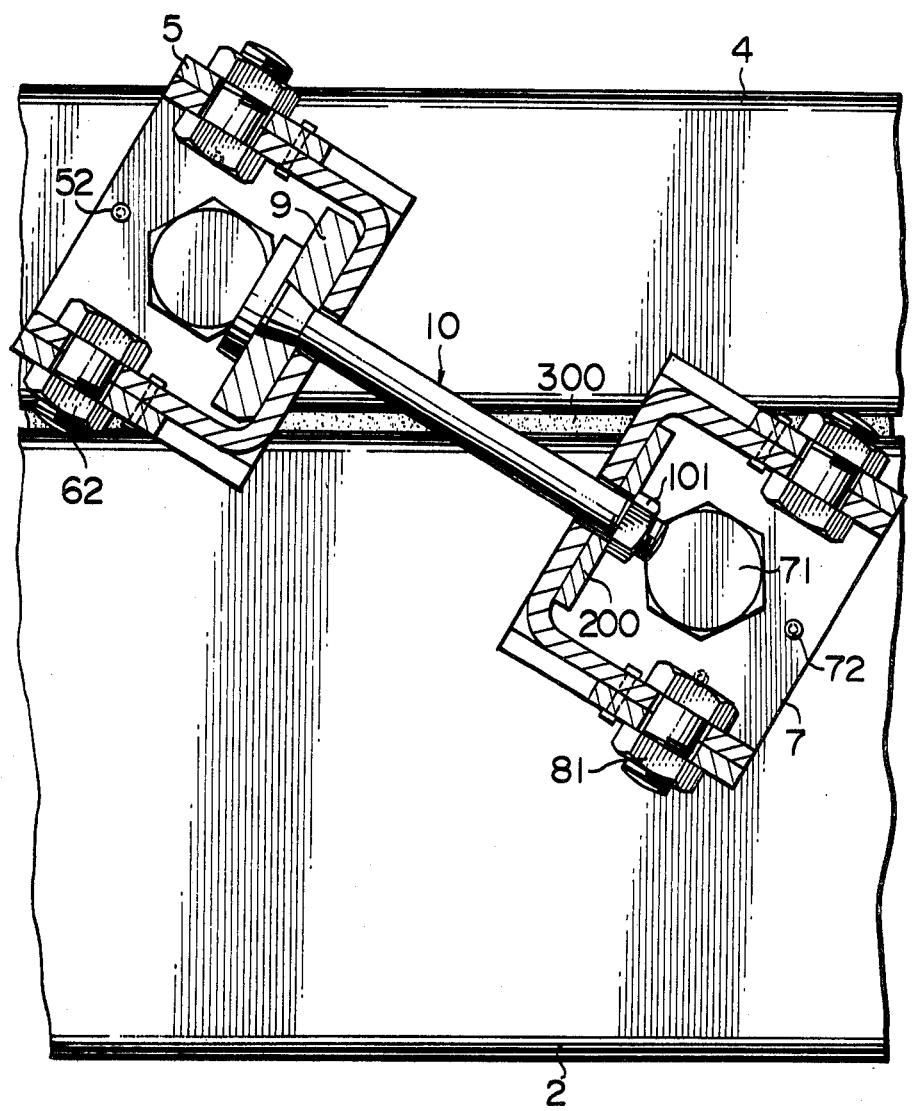
FIG. 4 is a schematic view illustrating the operating condition of the first embodiment.

When the truck 1 having the above-described construction collides head-on with some obstacle, the shock absorber 31' between the frame 2 and the bumper 31 operates to absorb part of the kinetic energy of the vehicle due to the collision. If at this time impact force exceeding a given value works on the burden carrier 4', the holders 600 are broken or heavily deformed, and then the first and third shear pins 52 and 72 are sheared by the impact force exceeding the shear resistance of these pins, in a way well known by itself. This causes the burden carrier 4' to move forward over the frame 2, which, in turn, rotates the first bracket 5, third bracket 7, and drawable member 10 counterclockwise in FIG. 2. The further forward movement of the burden carrier 4' with the longitudinal sill 4 results in an increase in the distance between the first and third brackets 5 and 7, or between the second and fourth brackets 6 and 8, whereupon the drawable member 10 becomes drawn through the die 9 as shown in FIG. 4. The drawable member 10 extends until the stopper 102 comes in contact with the die 9, thus absorbing the kinetic energy of the burden carrier 4' and preventing the burden carrier 4' from colliding against the cabin 3. By this means, safety of the passenger in the cabin 3 can be insured.

When the truck 1 collides aslant with an obstacle, the resultant impact force works on the burden carrier 4'. The longitudinal component of the force with which the burden carrier 4' tends to advance aslant shears the first and third shear pins 52 and 72, whereas the transverse component thereof shears the second and fourth shear pins 63 and 82. Then, the burden carrier 4' is allowed to advance aslant relative to the chassis frame 2, as a result of which the first, second, third and fourth brackets 5, 6, 7 and 8, and the drawable member 10 are rotated, the drawable member 10 is drawn through the die 9, and the kinetic energy of the burden carrier 4' is absorbed thereby. The stopper 102 prevents the drawable member 10 from being thoroughly drawn out of the die 9, which might cause the burden carrier 4' to crush the cabin 3, or fall from the frame 2.

The above-described first embodiment has the friction plate 300, but, of course, an apparatus without the friction plate 300 can achieve the same operation and result. And the same thing can be said as to each of the following embodiments and modifications.

Figure 5:
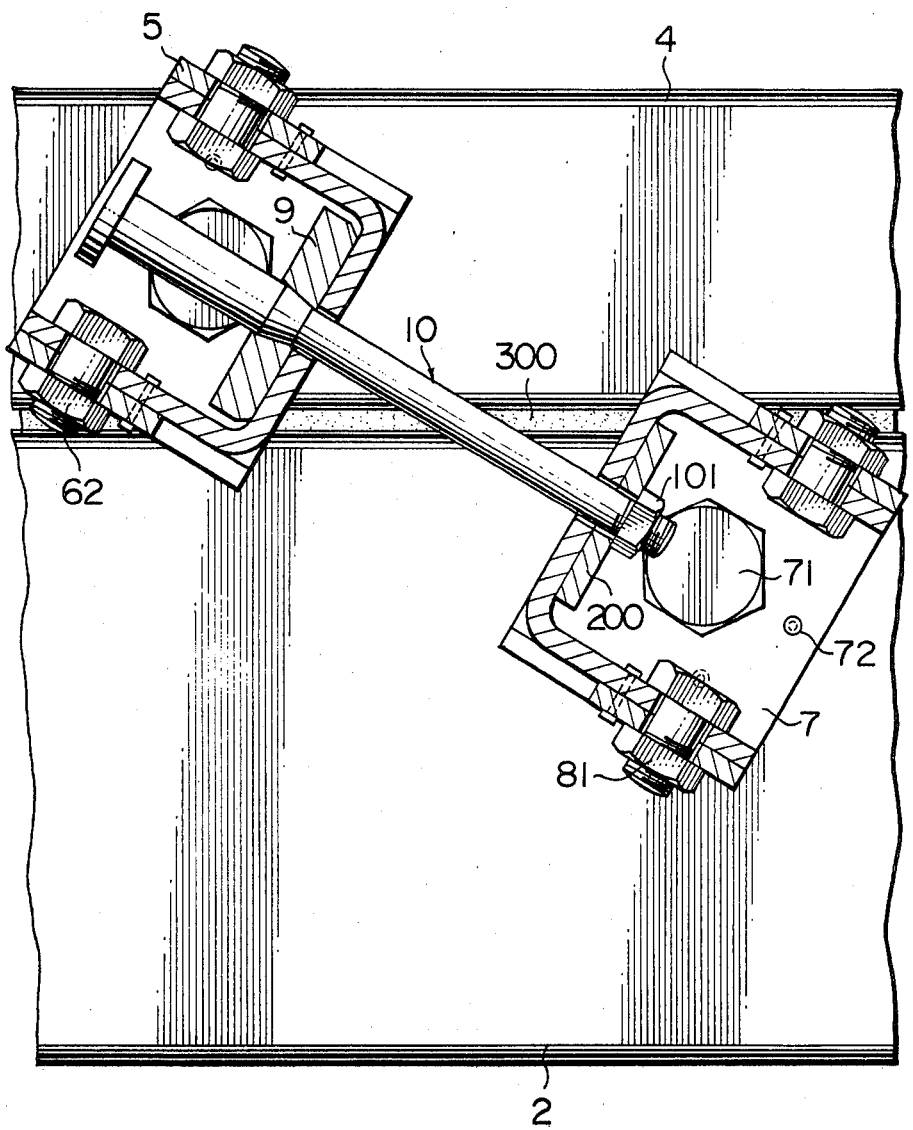
FIG. 5 is a partly cross-sectional elevation of a second embodiment of this invention, in which the drawable member is disposed aslant from the beginning.

Also, instead of being vertically disposed as in the above-described first embodiment, the drawable member 10 may be disposed in such a manner as to obliquely cross the friction plate 300, as in a second embodiment shown in FIG. 5.

Figure 6:
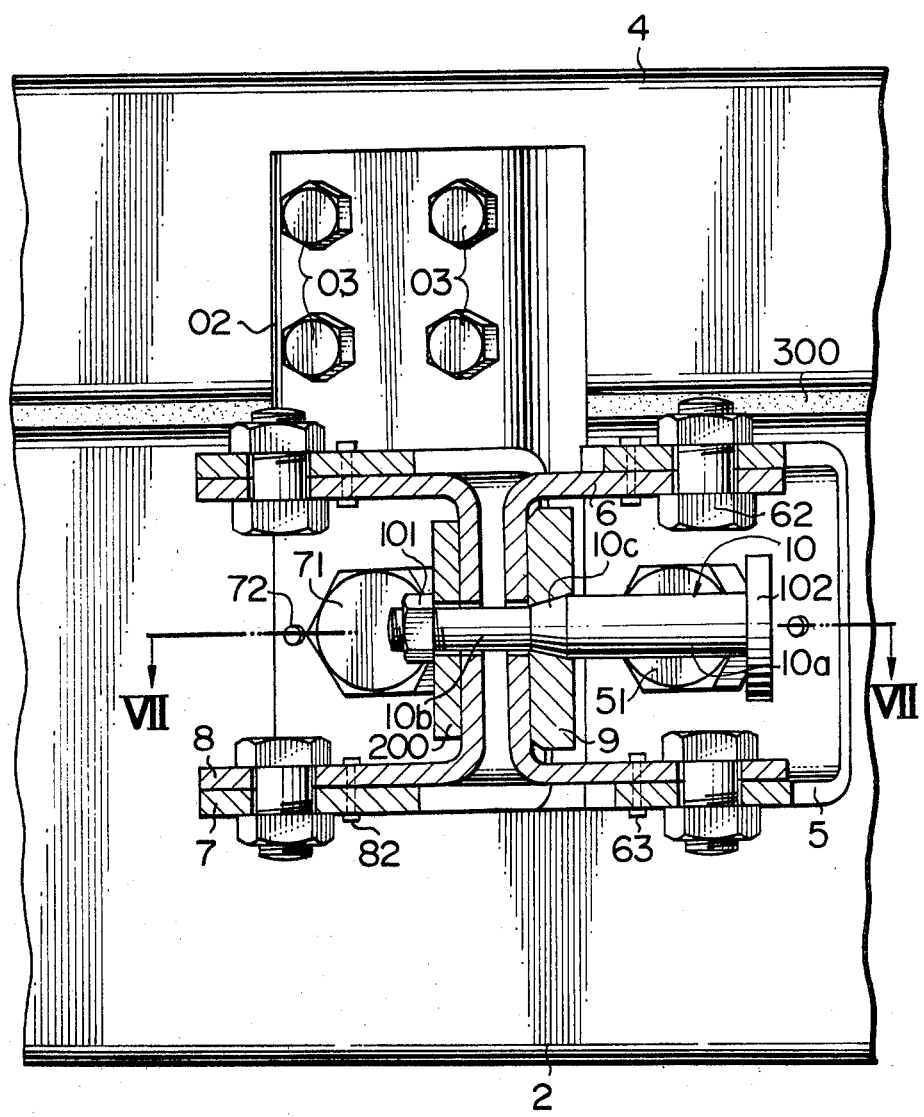
FIG. 6 is a partly cross-sectional side elevation showing a third embodiment of this invention.
Figure 7:
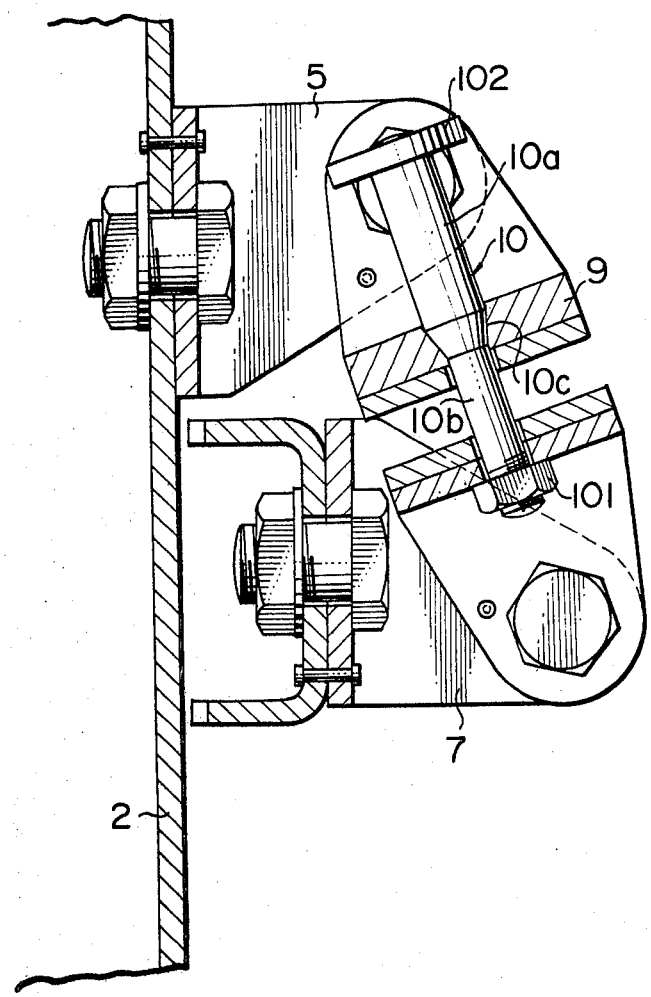
FIG. 7 is a cross-sectional view taken along the line VII—VII of FIG. 6.
Figure 8:
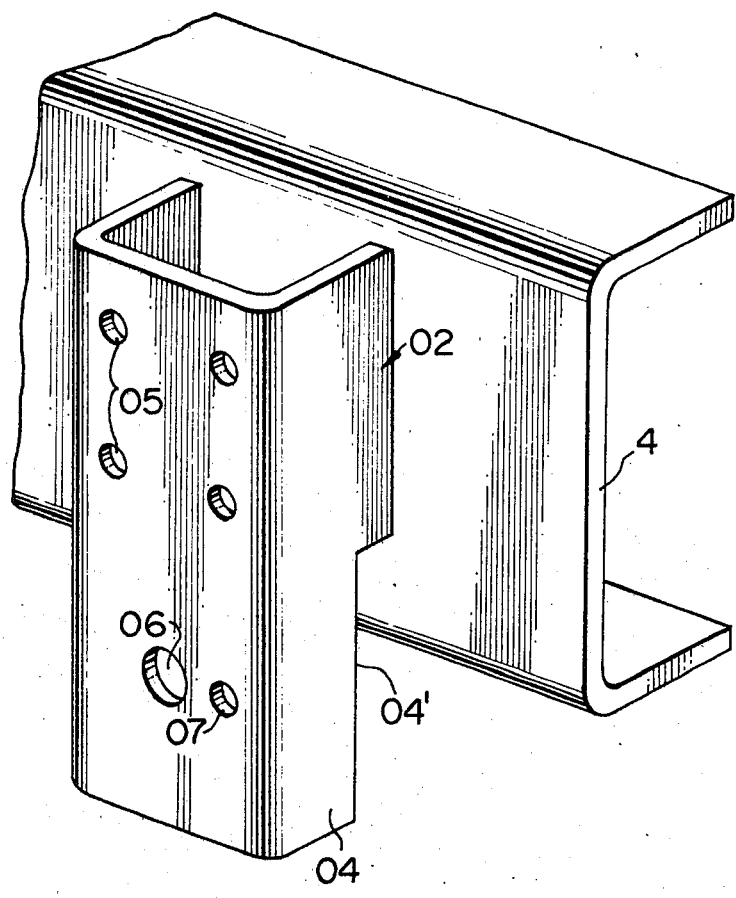
FIG. 8 is an enlarged perspective view of the support arm in the embodiment of FIG. 6.

In FIGS. 6 through 8 is shown a third embodiment of this invention, in which the drawable member 10 is disposed so as to extend substantially parallel to the longitudinal axis of the vehicle when viewed from the side, and to cross the center axis of the vehicle when viewed from above. Reference numeral 02 designates a support arm, having a channel-shaped cross-section, that is fitted to the longitudinal sill 4 with four bolts 03. The lower extended portion 04 of the support arm 02 is formed with an inward notch 04' so as not to touch the frame 2. To this lower extension 04 is fitted the third bracket 7, coupled with the fourth bracket 8, with a bolt 71. This fitting is effected in perfectly the same manner as in the above-described first and second embodiments. Because of this arrangement, the drawable member 10 is subjected to rotation, inclination and displacement irrespective of the angle at which the vehicle collides against other object, which permits the resulting kinetic energy of the burden carrier 4' to be always smoothly absorbed. In FIG. 8, reference numeral 05 denotes bolt holes for the bolts 03, 06 a bolt hole for the bolt 71, and 07 a hole for the third shear pin 72.

Figure 9:
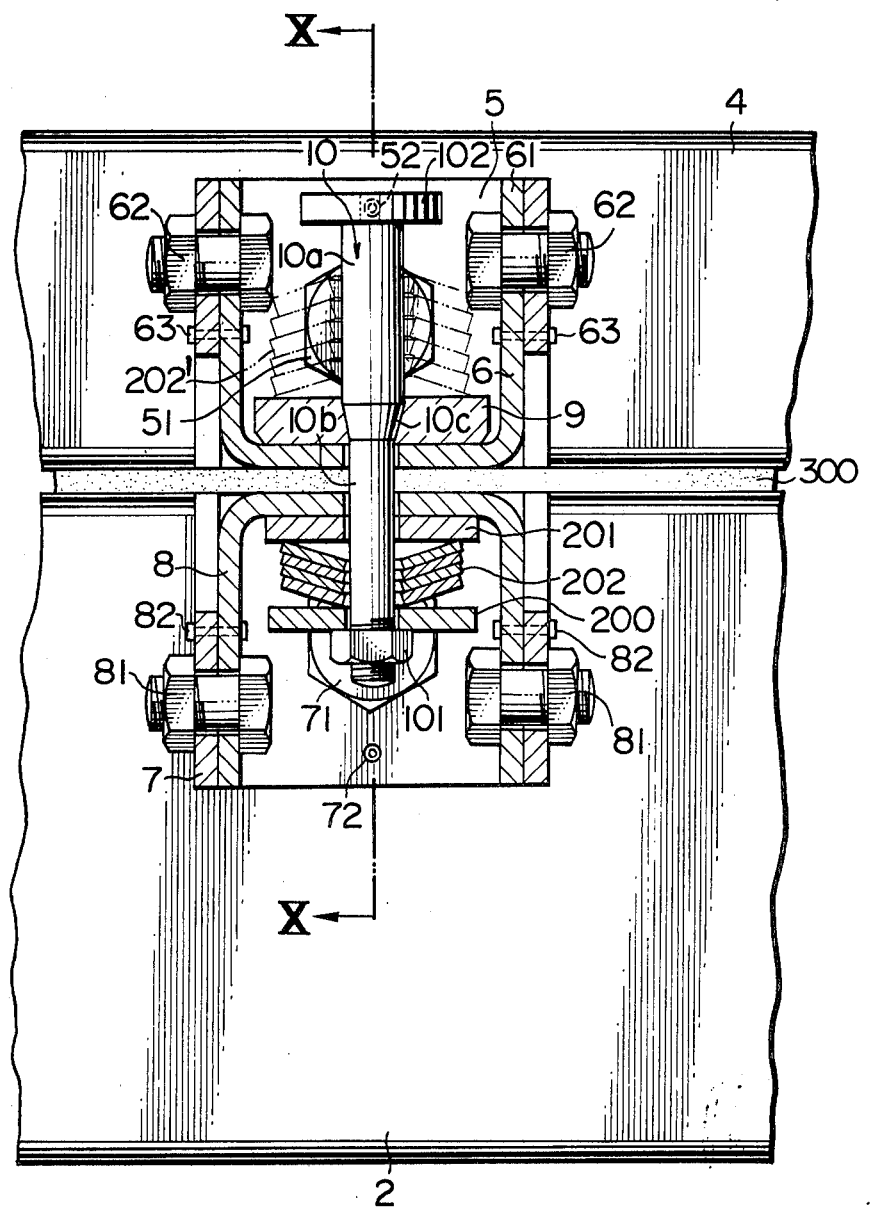
FIG. 9 is a partly cross-sectional side elevation showing a principal portion of a first modification which comprises adding the initially-coned disc springs to the first embodiment.
Figure 10:
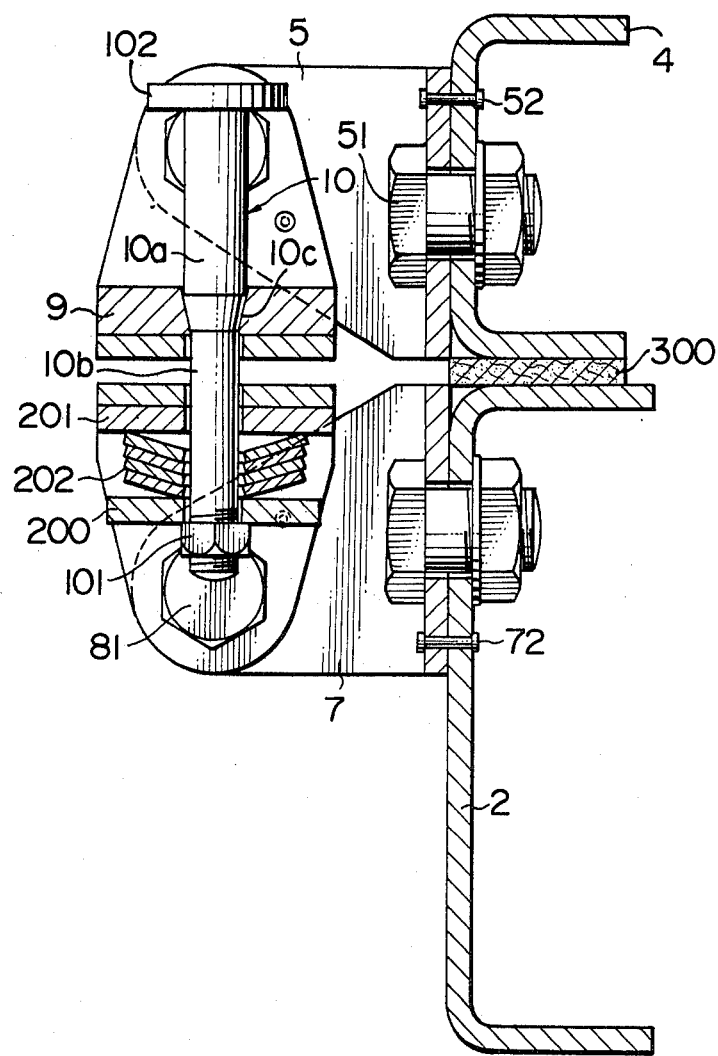
FIG. 10 is a cross-sectional view looking in the direction of the arrow from the line X—X of FIG. 9.
Figure 11:
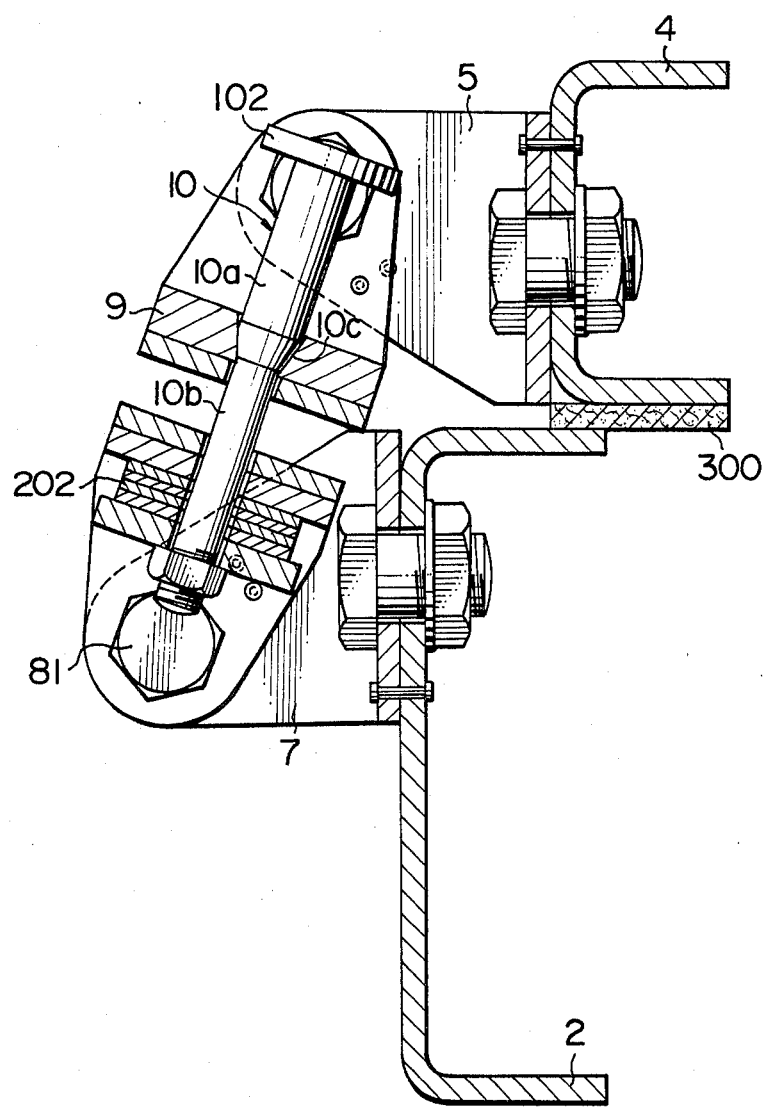
FIG. 11 is a view similar to FIG. 10, but showing the operating condition of the first modification.

In the above-described first, second and third embodiments, it might possibly occur that the drawable member 10 be broken, or that the smooth drawing of the drawable member 10 through the die 9 be made difficult, because usually impact force is applied so suddenly on the die 9 and the drawable member 10. To overcome this, as shown in a first modification in FIGS. 9 and 10, a washer 201 is provided so as to contact the lower surface of the fourth bracket 8, and a plurality of initially-coned disc springs 202, a kind of the spring member, are interposed between the washer 201 and the washer 200 for the nut 101, with the drawable member 10 passed therethrough. When impact force is applied to the vehicle sideward, as shown in FIG. 11, the initially-coned disc springs 202 are compressedly deformed, absorbing the initial impact load working on the drawable member 10. This permits smooth drawing of the drawable member 10 through the die 9. The above-described first modification is provided with the washer 201, but, of course, the arrangement without the washer 201 can serve the same purpose.

Figure 12:
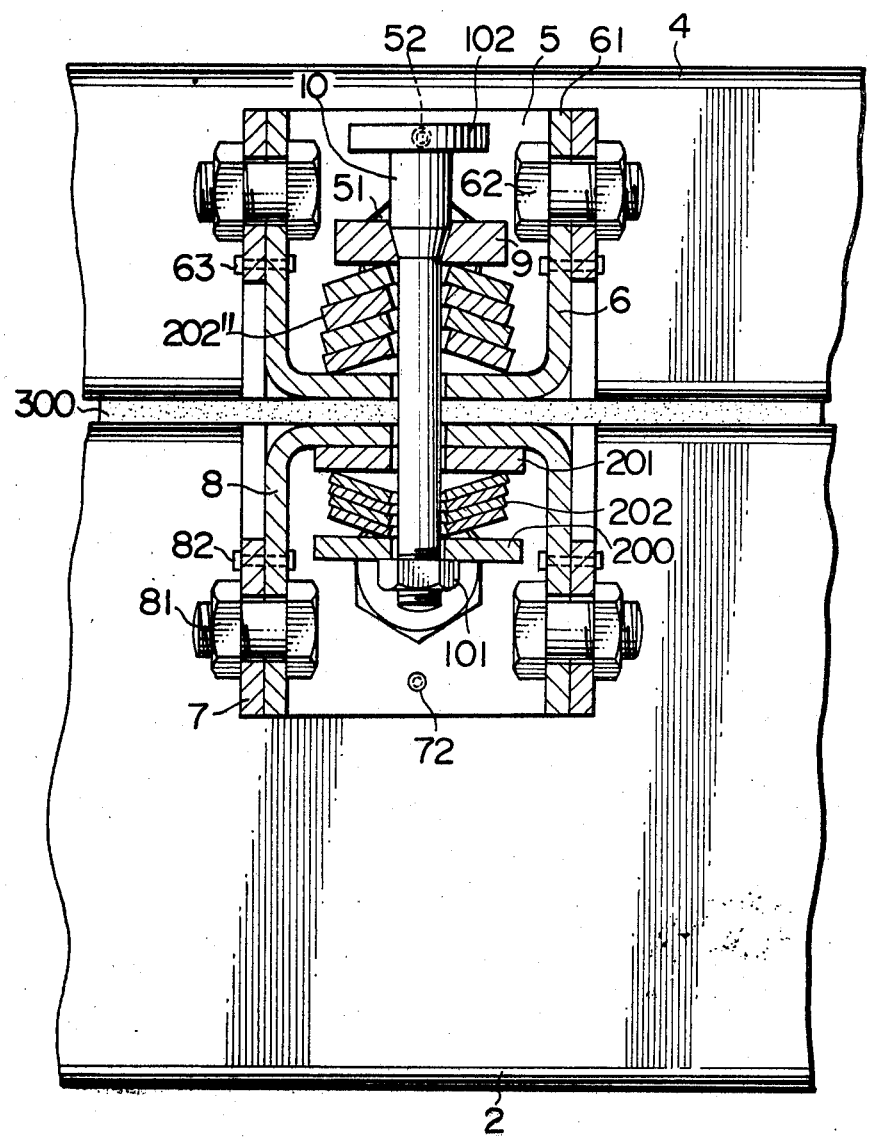
FIG. 12 is a partly cross-sectional side elevation showing the provision of the additional initially-coned disc springs between the die and the second bracket of the first modification.

In the above-described first modification, the initially-coned disc springs 202 are placed between the washer 201 under the fourth bracket 8 and the washer 200 through which the drawable member 10 is passed. But it is also possible, instead, to place the initially-coned disc springs 202' between the die 9 and the stopper 102 as shown by a dotted line in FIG. 9, or to provide an additional set of initially-coned disc springs 202" between the die 9 and the second bracket 6, too, as shown in FIG. 12.

Instead of the initially-coned disc springs used in the above-described modifications, a coil spring, a U-shaped spring, or other suitable spring means may also be used as the spring member.

Further, the drawable member 10 of the above-described modifications is provided between the longitudinal sill 4 under the burden carrier 4' and the frame 2. But it may also be provided between the cabin 3 and the frame 2, as denoted by 01 in FIG. 1.

Figure 13:
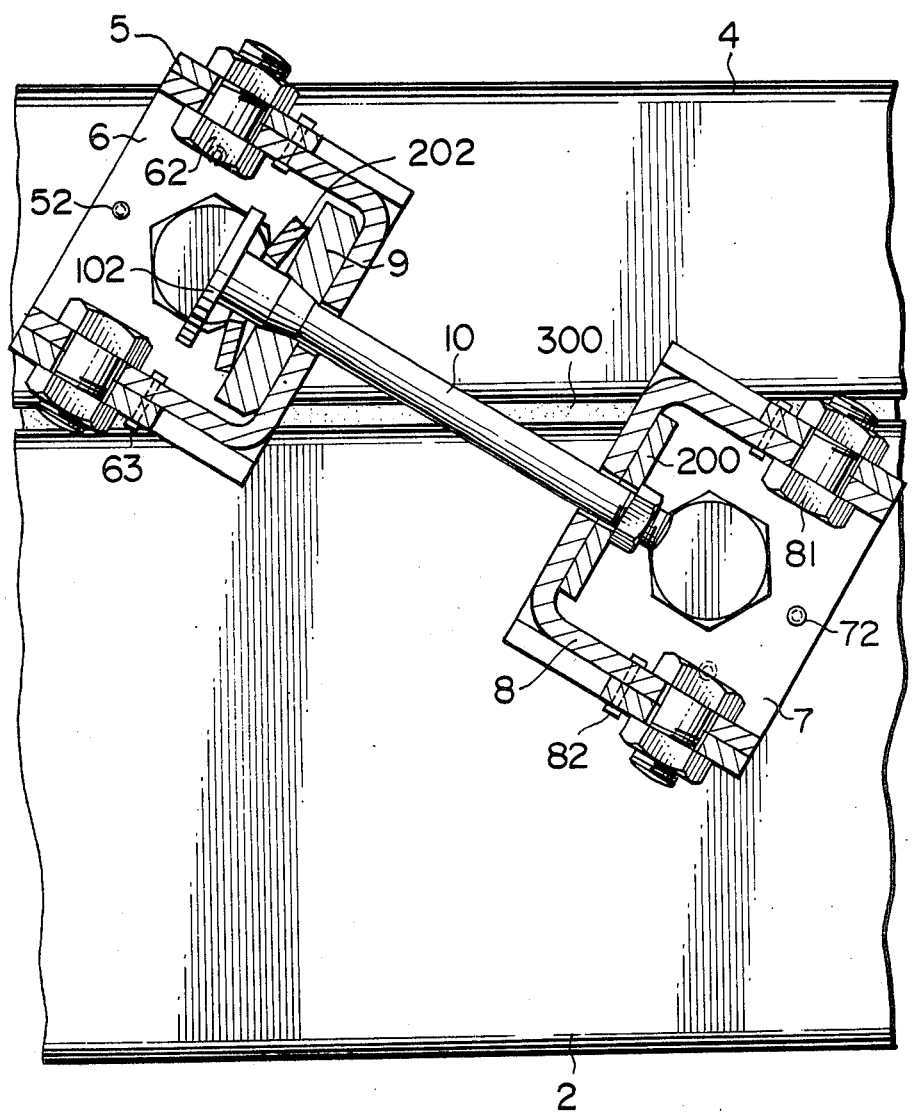
FIG. 13 is a partly cross-sectional side elevation of a second modification which comprises adding the initially-coned disc springs to the second embodiment.

Besides, the drawable member 10 is substantially vertically disposed in the above-described modifications. But it is also possible to dispose the drawable member 10 aslant, with the initially-coned disc springs 202, as in a second modification shown in FIG. 13, which is a modification of the second embodiment shown in FIG. 5.

Figure 14:
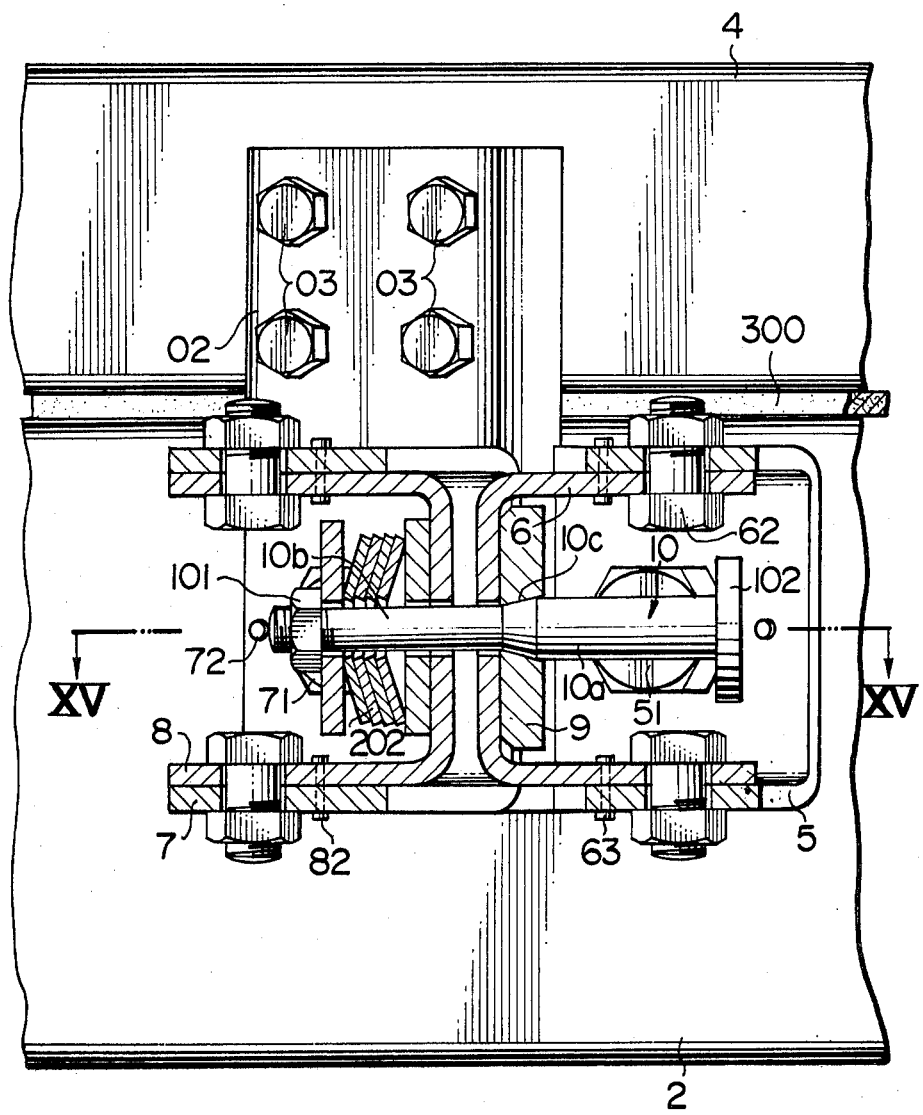
FIG. 14 is a partly cross-sectional side elevation of a third modification which comprises adding the initially-coned disc springs to the third embodiment. Finally.
Figure 15:
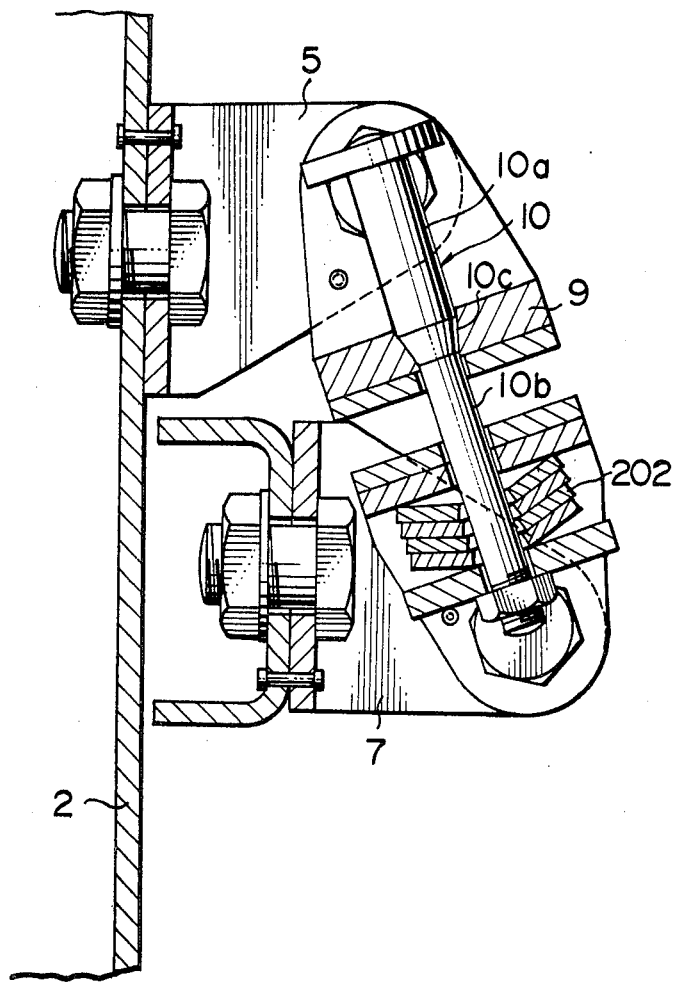
FIG. 15 is a cross-sectional view looking in the direction of the arrow from the line XV—XV of FIG. 14.

In addition, the initially-coned disc springs 202 may be combined with the drawable member 10 that is disposed so as to extend substantially parallel to the longitudinal axis of the vehicle when viewed from the side, and to cross the center axis of the vehicle when viewed from above, as in a third modification shown in FIGS. 14 and 15, which is a modification of the third embodiment shown in FIGS. 6 through 8. The overall construction of this modified energy absorbing apparatus is substantially the same as the third embodiment shown in FIGS. 6 through 8.

As described above, in the energy absorbing apparatus of this invention, the drawable member 10 and the die 9 are fitted to the frame 2 and the burden carrier 4', by means of the channel-shaped brackets 5, 6, 7 and 8, so as to be rotatable three-dimensionally, and the initially-coned disc springs 202 that elastically restrain the movement of the drawable member 10 with respect to the die 9 are provided. Due to this arrangement, the apparatus according to this invention is simpler in construction and cheaper in cost, compared with the previously proposed apparatus in which the drawable member and die are fitted to the frame and the burden carrier or cabin through spherical surfaces.

In the above-described embodiments and modifications thereof, the first shear pin 52 and the third shear pin 72 on the the brackets may be omitted, if shear pins are interposed between the frame 2 and the longitudinal sill 4, or the holders 600 are so designed as to perform also the function of the first and third shear pins 52 and 72.

All of the above embodiments and modifications thereof have been described in connection with a truck. However, they are, of course, applicable to saloons or sedans, trailer-trucks, railroad rolling-stocks, and varioous other vehicles.

What is claimed is:

1. An impact energy absorbing system for vehicles, comprising;

energy absorbing means which in turn comprise a first bracket rotatably secured in use to a burden carrier of a vehicle, a second bracket supported by the first bracket so as to be rotatable in a plane normal to a plane of rotation of the first bracket, a third bracket rotatably secured in use to a frame of the vehicle, a fourth bracket supported by the third bracket so as to be rotatable in a plane normal to a plane of rotation of the third bracket, a die secured to one of the supported brackets and having a die hole, and a drawable member secured to the other supported bracket and having a large-diameter portion disposed to be drawn through the die hole;

shear pin means, comprising, a shear pin interposed between the first bracket and second bracket, and another shear pin interposed between the third and fourth brackets, to restrain relative rotation of said first and second brackets and of said third and fourth brackets unless an impact force exceeding a given value is applied to the vehicle; and further shear pin means comprising a primary shear pin interposed in use between the burden carrier and the first bracket, and a secondary shear pin interposed in use between the frame and the third bracket, to restrain rotation of the first and third brackets relative to the carrier and frame, respectively, unless an impact force exceeding said given value is applied to the vehicle;

whereby, when an impact force exceeding said given value is applied to the vehicle, the burden carrier, moving longitudinally of the frame, causes the first and third brackets to rotate relative to the carrier and frame, respectively and moreover causes the second and fourth brackets to rotate relative to the first and third brackets, respectively, thereby causing the large-diameter portion of the drawable member to be drawn through the die hole, and the impact force to be absorbed by the resulting plastic deformation of said portion.

2. A system according to claim 1, additionally including holder means interposed between the frame and the burden carrier for being plastically deformed, and thereby to enable the moving of the burden carrier longitudinally of the frame when an impact force exceeding said given value is applied to the vehicle.

3. A system according to claim 1, also including a friction plate mounted between the burden carrier and the frame to frictionally counteract the moving of the burden carrier longitudinally of the frame.

4. A system according to claim 1 additionally including means for stopping the drawing of said portion of the drawable member through the die hole when all of the portion except an extremity thereof has been drawn through the die hole.

5. A system according to claim 1 in which the drawable member is disposed substantially vertically so long as no impact force exceeding the given value is applied to the vehicle.

6. A system according to claim 1 in which the drawable member is disposed parallel to one of the planes of rotation but to extend obliquely to a longitudinal axis of the vehicle.

7. A system according to claim 1 in which the drawable member and one of the planes of rotation are horizontal.

8. A system according to claim 1 including a nut threaded upon an end portion of the drawable member remote of the large-diameter portion, and a washer fitted to said other supported bracket for engagement with the nut and for thereby effecting the fitting of the drawable member to said other bracket.

9. A system according to claim 1 including U-bolts for securing the burden carrier to the frame subject to the moving of the carrier upon said impact.

10. A system according to claim 1 including an elastic member coaxial with the drawable member and disposed to elastically react to an initial portion of the impact force which causes the several bracket means to rotate, before said force causes the drawing of the large-diameter portion through the die hole.

11. A system according to claim 10 including a washer fitted to said other supported bracket for the fitting of the drawable member to said other bracket; the elastic member being interposed between an end portion of the drawable member and the washer.

12. A system according to claim 11 including another washer fitted to said end portion; the elastic member being interposed between the washers.

13. A system according to claim 10 including a stopping plate secured to a free end of the large-diameter portion for stopping the drawing of said portion through the die hole when the end is adjacent the die hole; the elastic member being interposed between the stopping plate and the die.

* * * * *